Patented Sept. 6, 1949

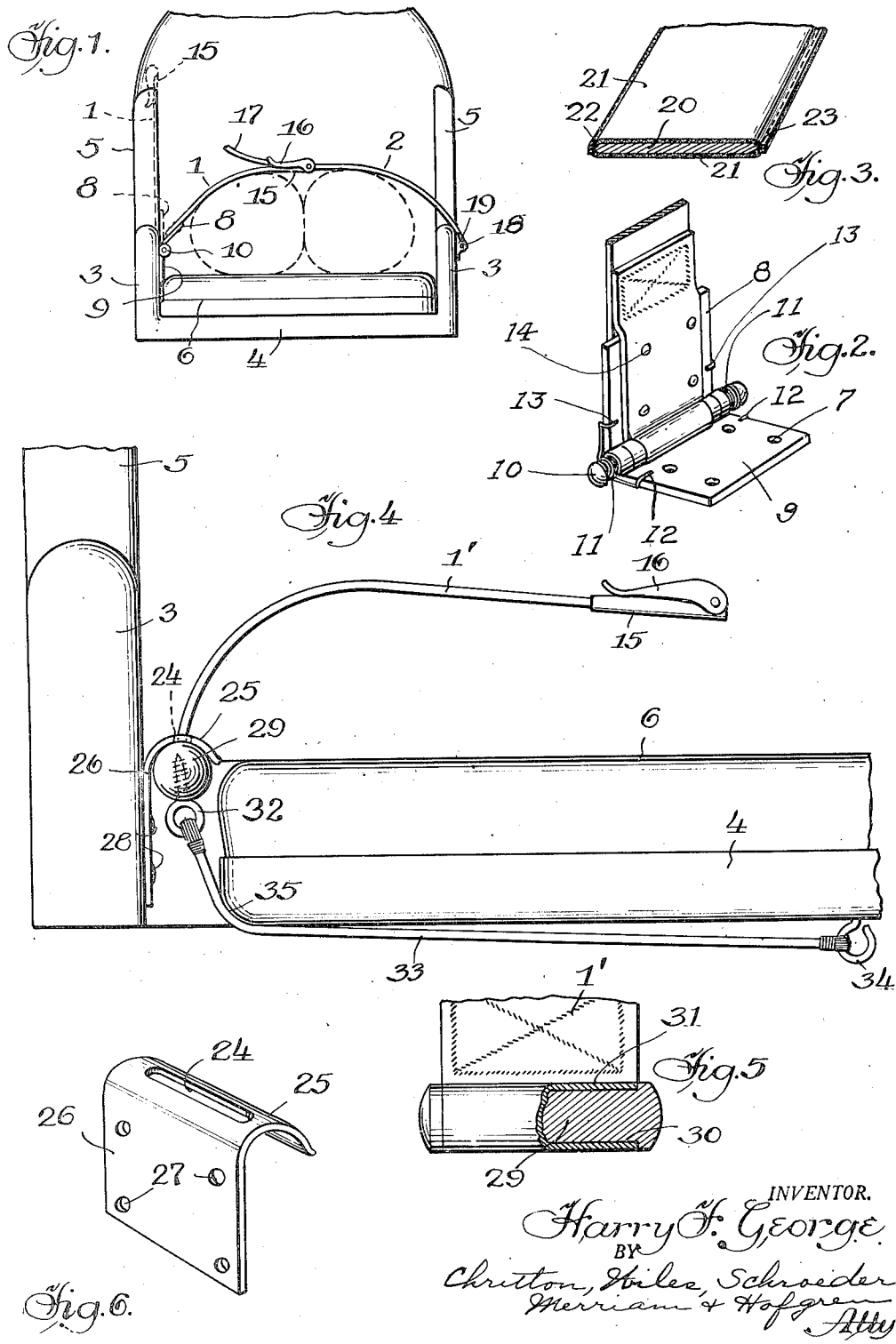

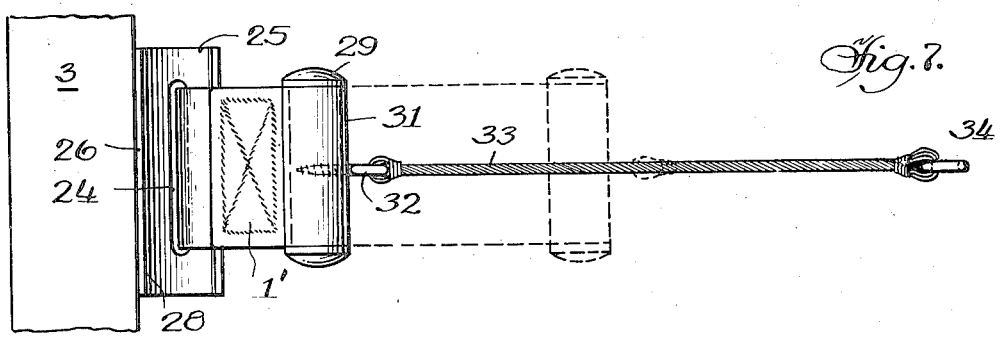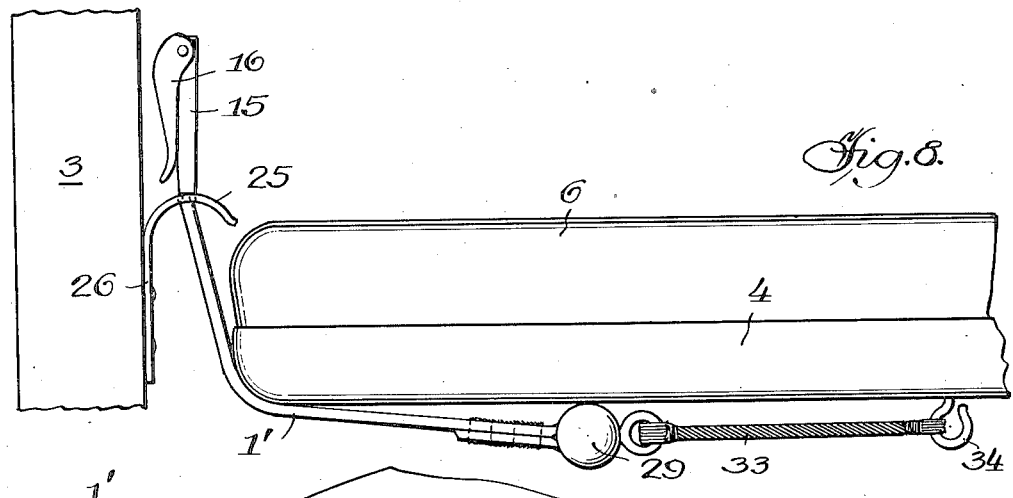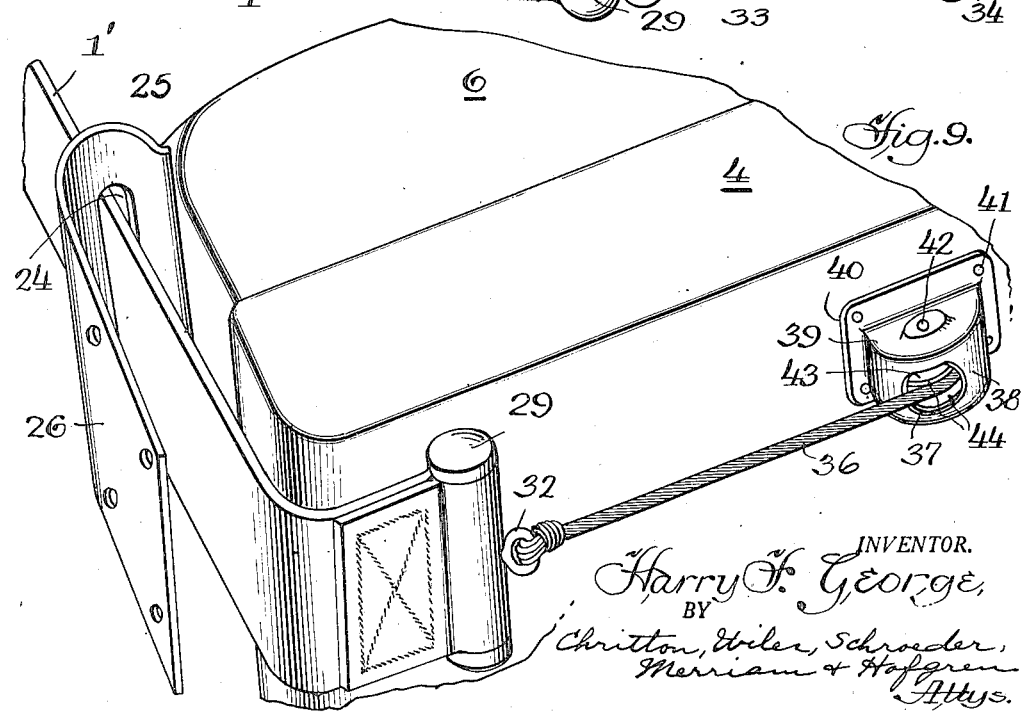

2,480,915

UNITED STATES PATENT OFFICE 2,480,915

RETRACTABLE SAFETY BELT

Harry F. George, Chicago, Ill.

Application August 30, 1945, Serial No. 613,681

3 Claims. (Cl. 155—189)

1

This invention relates to a safety belt for occupants of airplanes and other means of transportation in which, for safety purposes, the occupant is strapped in the seat by a safety belt having a quickly releasable buckle, and more particularly to means for so mounting the belt in connection with the seat that when the buckle is released the portion of the belt carrying the buckle will be automatically moved away from the upper surface of the seat and at the same time the buckle will be moved to such position as to avoid possibility of injury to the occupant from unexpectedly sitting thereon.

In safety belts of the type here referred to, the buckle, in order to give required strength, and at the same time be instantly releasable, must be of substantial size, and, as will be obvious, if such buckles were on the upper surface of the seat at the time the occupant sat thereon, considerable damage might result to the occupant from sitting on the buckle. By use of the present invention, such injury to the occupant, or inconvenience from not having the buckle instantly available for tightening the safety belt in operative position, is avoided.

Among the objects of the present invention are: to provide a novel and improved retractible safety belt; to provide a safety belt in which the buckle is automatically moved away from that portion of the seat upon which the occupant sits, when the buckle is released; to provide means for so positioning the buckle after it is released and moved away from the main part of the seat, that it will be available for easy and quick grasping by the occupant when the safety belt is to be again fastened in operative position over the occupant's lap; to provide a safety belt having means to insure that the occupant may sit in the seat at any time without sitting upon the buckle; and such further objects, advantages and capabilities, inherently possessed by my invention, as will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 1 is a front elevation, with the upper part broken away, of a seat in an airplane having a safety belt embodying my invention, and showing the belt fastened in operative position over the occupant's lap.

2

Fig. 2 is an enlarged perspective view of the hinge member for securing the buckle portion of the belt to the side portion of the seat, and having spring means for swinging this portion of the belt out of the way when the buckle is released.

Fig. 3 is a fragmentary, perspective, sectional view, enlarged with relation to Fig. 1, of a portion of one form of the belt.

Fig. 4 is a modified form of my invention, showing a fragmentary front elevation of a seat in an airplane, with the buckle half of the belt pulled out of its housing to the maximum amount to enable it and the other half of the belt to be fastened across the operator's lap, and shown on a larger scale than Fig. 1.

Fig. 5 is a fragmentary, side elevation, partly in section, of an end portion of the belt of Fig. 4 fastened to a stop member for limiting the amount of outward movement of the buckle half of the belt from its housing.

Fig. 6 is a perspective view of the limit plate through which the buckle half of the belt passes in the form of my invention shown in Fig. 4.

Fig. 7 is a detail bottom plan view of that portion of the belt retracting means of Fig. 4, below the limit plate and showing the bottom portion of the belt partially retracted in full lines, and fully retracted in dotted lines.

Fig. 8 is a fragmentary front elevation of the form of my invention shown in Fig. 4, showing the belt fully retracted.

Fig. 9 is a fragmentary perspective view looking at an angle toward the corner of the seat and showing the seat cushion, a portion of the belt, the retracting means and the limit plate, of a further modified form of my invention.

Referring more in detail to the drawings, my invention is shown in Figs. 1–3 as comprising a safety belt having two separable parts 1 and 2, each secured at one end to a side member 3 extending upwards on each side of the main seat portion 4, these side members merging into the upper portions of arm rests 5. Positioned upon the seat portion 4 is the usual cushion 6, and secured to one of the side members 3 by screws, bolts, or the like passing through holes 7 in the lower portion thereof, is a hinge formed of an upper swingable plate 8 and a lower stationary plate 9, swingably connected together by a pin 10 around each end of which is coiled a spring 11 having at one end an extension 12 bearing against the lower hinge plate 9 and at the other end an extension 13 bearing against the upper swingable hinge plate 8 to normally urge the latter into upright position against its side member 3 when the belt is released.

The outer end of safety belt strap 1 is passed through a slot between the adjacent edges of the two hinge plates 8 and 9, around the pin 10 and then upwardly over the upper hinge plate 8 where the free end is sewed or otherwise secured to the outer part, and also is secured by rivets 14, or other suitable fastening means, to the swingable plate 8 of the hinge. Fixed to the other, or free end of strap 1, is a safety buckle 15 having a swingable plate 16 beneath which passes the free end 17 of the other strap 2 of the belt so that when in tightened position the buckle may be instantly released to free the belt by pulling upwardly on the free end 17 of strap 2 which will swing the plate 16 to released position and free the occupant of the seat from the belt. A safety buckle of this type is disclosed in United States Letters Patent No. 2,369,225 granted to me February 13, 1945 for "Safety buckle." Any suitable form of safety buckle may be used as desired, as in my pending application Serial No. 575,947, filed February 3, 1945 for "Buckle," or other forms of safety buckles may be used without departing from the spirit of the present invention. The main requirement is that a type of buckle be used that can be instantly released to quickly free the occupant from the belt when necessary.

In Fig. 1 the strap 1, carrying the buckle 15, is semi-flexible, by which is meant that it has sufficient flexibility to enable it to be curved over the occupant's lap to the required extent as shown in solid lines in Fig. 1, and at the same time rigid enough to be swung upwardly into upright position clear of the occupant and clear of the seat cushion when the belt is released, as shown in vertical dotted lines in the left hand side of Fig. 1. The strap 2, forming the other half of the belt, when the belt is released, having no buckle thereon to injure anyone when thrown sidewise, is tossed to one side to swing around the supporting pin 18 in bracket 19 fixed in suitable position on the side member 3 opposite to the one to which the hinge 8—9 is attached. This means that when the safety buckle 15 is released to free the straps 1 and 2 from each other, the strap 2 may be tossed sidewise out of the way, and the strap 1 and its buckle will, under action of coiled spring 11 in the hinge, automatically swing upwardly into substantially vertical position and be out of the way of the seat, so that when a person again sits in the seat he will be protected against injury from sitting on the buckle for the reason that the buckle is always out of the way when the belt is released.

The strap 1, as well as the strap 2, may be of any desirable construction. I have shown one form in Fig. 3, which comprises a fibrous inner body portion 20 covered on both faces with a layer of canvas, leather or other suitable facing material 21 which are sewed together at the edges as indicated at 22 and 23. By properly selecting the materials used, regarding flexibility, a strap (particularly strap 1) made therefrom will have the desired characteristics as to bending over the occupant's lap the desired amount and yet stand upright under the action of spring 11 when the belt is released.

In the form of my invention shown in Figs. 4–8, the strap 1' is provided at its free end with the same buckle 15 as in Fig. 1, but at its opposite end is passed through a slot 24 in the curved portion 25 of limit plate 26 formed with holes 27 to receive rivets, bolts or the like 28 for securing this plate onto the side member 3 in the position shown in Fig. 4. Fixed to the rear end of strap 1' below the slot, in any suitable manner, is a stop member which, for illustrative purposes only is shown as formed of a wooden bar 29 having a circumferential recess 30 to receive a loop 31 on the strap to permanently fix the stop member in place in the end of the strap. Any other form of stop member and limit plate may be used as desired for the purpose intended.

Screwed or otherwise secured in the stop member 29 is an eyelet or the like 32 to which is secured the end of an elastic cord or the like 33 which at its other end is secured to a stationary member 34 fixed to the bottom of the seat or other desired location in any manner desired. The adjacent corner 35 of the seat bottom is curved to permit easy sliding of the elastic cord, the stop member and the strap thereover. As seen in Fig. 8, when the safety buckle 15 is released and the two strap parts freed from each other and from the occupant's lap, the elastic cord, which was put under tension when the buckle and strap were pulled upwardly and fastened over the occupant's lap, will pull the strap downwardly through slot 24 in the limit plate until the buckle strikes the curved top of the limit plate to hold the buckle standing upwardly as in Fig. 8 to position the same clear of the seat cushion and automatically guarantee that when a person again sits upon the cushion it will be impossible for him to injure himself by sitting on the buckle, as has so often happened prior to my invention. When the strap 1' is pulled upwardly through slot 24 and the belt fastened over the occupant's lap the stop member 29 will strike the under face of the curved top 25 of the limit plate 26 and prevent further outward movement of strap 1' when the airplane is given a jerk, as for example when encountering an air pocket, or when landing, or when the airplane or other vehicle is subjected to a shock from any cause whatever.

The form of my invention shown in Fig. 9 is the same as that in Figs. 4–8 except that instead of using an elastic cord for retracting the belt strap 1' I have provided an inelastic cord, strap, cable or other suitable flexible, elongated member 36 secured at one end by the eyelet 32 of the stop member 29, and at the other end passed through the opening 37 in the lower curved face 38 of the metal casing 39 or other suitable housing having marginal flanges 40 secured to the bottom of the seat 4 by screws or the like 41. Within the casing 39 is a rotatable shaft 42 having fixed thereto a drum 43. The cord 36 after passing through slot 37 is wound up on the drum 43 which is normally urged to rotate in a wind-up direction by a coil spring 44 so that when the cord 36 is pulled out of the casing 39 by a pull on the belt strap, the drum because of spring 44 is put under tension whereby the belt strap 1' and cord 36 will be automatically retracted when the belt strap is released. When the belt is fastened by the buckle over the occupant's lap this will hold the strap and cord extended, but when released by unfastening the buckle these parts will be retracted to pull the buckle against the curved top of the limit plate 26 to the position shown in Fig. 8 and out of the way of the seat cushion to automatically prevent injury by the buckle to the person about to sit on the seat. As stated earlier, the other one of the two belt straps may be thrown sidewise, when the occupant gets out of the seat, as it does not have a buckle but is a plain strap having one end slipped through the buckle and gripped therein by tightening the buckle. Upon releasing the buckle this strap end readily slips out of the buckle.

In the form of my invention shown in Figs. 4–9 the pull of the resilient means upon the strap 1', when the belt is fastened in position across the occupant's lap, is not strong enough to give any discomfort to the occupant, but is of sufficient strength to retract the strap 1' and return the buckle to the position shown in Fig. 8 when the buckle is released to free the belt from the occupant's lap. When the two straps are fastened together in operative position the stop member 29 will be in the position shown in Fig. 4 which will prevent the belt from having any give or looseness while in use.

I claim:

1. In combination a seat device, and a safety belt comprising two straps each secured at one end to said device, one of said straps having at its forward end a safety buckle and at its rear end a stop member, a limit plate secured to said seat device and having a flange member formed with a slot through which the last mentioned strap passes, an elastic cord secured to said stop member and passing underneath the seat device, and means for securing the rear end of the cord to the seat device so that when the buckle strap is pulled to position to fasten the occupant in the seat device the cord will be stretched and when the buckle is released the cord will pull the strap and its buckle away from the upper surface of the seat of the seat device.

2. In combination a seat device, and a safety belt comprising two straps one of which is connected at one end to said device and the other of which has at its forward end a safety buckle, a side plate secured to said seat device and having a slot through which the buckle strap between the buckle and the rear end is slidable, an elastic cord secured at one end to the buckle strap at the end remote from the buckle and at the other end secured to the seat device remote from the side plate, whereby when the buckle is pulled up laterally over an occupant's lap and fastened to the other strap the elastic cord is stretched, and when the buckle is released from the other strap the elastic cord will automatically pull the buckle strap rearwardly until the buckle is away from that portion of the seat normally occupied by an occupant.

3. A retractible safety belt strap for airplane and other seats requiring quick release of the occupant, comprising a strap having fixed upon one end a releasable buckle and upon the other end a stop member, a limit plate adapted to be fixed to a side arm of the seat and having a slot through which the strap is slidably mounted, and a retractible member fixed at one end to the stop member and at the other end adapted to be secured to a portion of the seat remote from the limit plate, said retractible member being an elastic cord.

HARRY F. GEORGE.

REFERENCES CITED

The following references are of record in the file of this patent:

UNITED STATES PATENTS

| Number | Name | Date |
|---|---|---|
| 1,895,222 | Johnson | Jan. 24, 1933 |
| 2,071,903 | Shively | Feb. 23, 1937 |
| 2,174,142 | Stickles et al. | Sept. 26, 1939 |
| 2,263,348 | Barros | Nov. 18, 1941 |
| 2,394,523 | Pancoe | Feb. 5, 1946 |
| 2,403,653 | Geohegan et al. | July 9, 1946 |

FOREIGN PATENTS

| Number | Country | Date |
|---|---|---|
| 700,743 | France | Jan. 2, 1931 |